US012144765B2

(12) United States Patent
Vega et al.

(10) Patent No.: US 12,144,765 B2
(45) **Date of Patent: *Nov. 19, 2024**

(54) COLLAPSIBLE CASKET VIEWING BARRIER

(71) Applicants: Jesus Vega, Mission, TX (US); Jason De Leon, Edinburg, TX (US)

(72) Inventors: Jesus Vega, Mission, TX (US); Jason De Leon, Edinburg, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,627

(22) Filed: May 2, 2023

(65) Prior Publication Data

US 2023/0263685 A1 Aug. 24, 2023

Related U.S. Application Data

(63) Continuation of application No. 17/474,361, filed on Sep. 14, 2021, now Pat. No. 11,672,719.

(60) Provisional application No. 63/078,394, filed on Sep. 15, 2020.

(51) Int. Cl.
*A61G 17/02* (2006.01)

(52) U.S. Cl.
CPC .................................... *A61G 17/02* (2013.01)

(58) Field of Classification Search
CPC .... A61G 17/02; A61G 17/00; A61G 17/0166; A61G 99/00; A61G 21/00; A61G 10/00; A47G 5/00; E04B 2/7422; E04B 2/7427; E06B 9/52
See application file for complete search history.

(56) References Cited

U.S. PATENT DOCUMENTS

| | | | | |
|---|---|---|---|---|
| 1,550,295 | A | 8/1925 | Weber et al. | |
| 1,558,558 | A | 10/1925 | Metcalf | |
| 1,573,398 | A | 2/1926 | Griffith | |
| 1,668,282 | A | 5/1928 | Moore et al. | |
| 1,891,963 | A | 12/1932 | Weber et al. | |
| 1,954,402 | A | 4/1934 | Culp et al. | |
| 2,326,565 | A | 8/1943 | Ripley | |
| 3,017,969 | A * | 1/1962 | Nielsen | F16B 5/0685 52/270 |
| 3,697,147 | A | 10/1972 | Schulte | |
| 4,407,053 | A | 10/1983 | Ball | |
| 4,648,162 | A | 3/1987 | Daino | |

(Continued)

*Primary Examiner* — William L Miller

(74) *Attorney, Agent, or Firm* — Boudwin Intellectual Property Law, LLC; Daniel Boudwin

(57) ABSTRACT

A collapsible casket viewing barrier includes a first transparent shield pivotally connected to a second transparent shield. The transparent shields are disposed within supporting frames that are connected via one or more hinges. Each supporting frame includes attached support legs, which may be telescopically adjustable and include wheels for easy transport. The first supporting frame and the second supporting frame are configured to move between a deployed configuration for use and a collapsed configuration for storage. When deployed during a funeral service, the collapsible casket viewing barrier can be positioned adjacent a casket such that the longer first transparent shield extends lengthwise along the casket while the shorter second transparent shield extends perpendicularly along the upper end of the casket. The casket is shielded in a way that allows individuals to view the deceased while reducing the transmission of germs.

15 Claims, 4 Drawing Sheets

(56) References Cited

U.S. PATENT DOCUMENTS

| | | | |
|---|---|---|---|
| 4,759,105 A | 7/1988 | Buerosse | |
| 5,007,473 A | 4/1991 | Evensen | |
| 5,373,863 A | 12/1994 | Prizio | |
| 5,535,489 A | 7/1996 | Cunagin et al. | |
| 5,797,499 A | 8/1998 | Pinco | |
| 5,960,966 A | 10/1999 | Riga et al. | |
| 6,116,326 A | 9/2000 | Domina et al. | |
| 6,123,321 A * | 9/2000 | Miller | A47D 13/065 256/25 |
| 8,430,149 B2 | 4/2013 | Gilbert | |
| 8,726,782 B2 | 5/2014 | White | |
| 9,198,818 B2 | 12/2015 | Tompkins | |
| 2009/0026160 A1 | 1/2009 | Wright et al. | |
| 2014/0138035 A1 | 5/2014 | Potter | |
| 2017/0306693 A1 | 10/2017 | Potter | |
| 2021/0363749 A1 | 11/2021 | Jordan | |
| 2022/0106787 A1 | 4/2022 | Levy et al. | |
| 2023/0201058 A1 * | 6/2023 | Vilcovsky | A61B 46/20 600/21 |

* cited by examiner

COLLAPSIBLE CASKET VIEWING BARRIER

CROSS REFERENCE TO RELATED APPLICATIONS

This application claims the benefit of U.S. Provisional Application No. 63/078,394, filed on Sep. 15, 2020. The above identified patent application is herein incorporated by reference in its entirety to provide continuity of disclosure.

BACKGROUND OF THE INVENTION

The present invention relates to transparent barriers for preventing germ transmission. More particularly, the present invention provides a collapsible casket viewing barrier that can be deployed to provide a germ barrier between funeral goers and the deceased to reduce germ transmission.

During a funeral service, attendees often view the deceased individual in an open casket. Individuals can walk up to the open casket to view and pay their respects to the deceased individual. Unfortunately, this viewing process can expose funeral home staff and funeral attendees to bacteria, viral particles, germs, and other unwanted contaminants. Many individuals often gather to attend the funeral, often from different social groups, and funerals additionally tend to be held in small, closed spaces, which can increase the risk of the transmission of germs and disease. In times of pandemic and in general, it is important to reduce or prevent the transmission of airborne germ particles. If the deceased individual or individual attendees of the funeral have been exposed to or are currently sick with a particular disease, the indoor and normally close-quarters atmosphere of the funeral service can make it more likely the disease will spread between individual attendees. In view of the above, it is desirable to provide a device that allows users to view and pay respects to the deceased while helping to reduce the transmission of germs and diseases during the funeral services.

In order to address these concerns, the present invention provides a collapsible casket viewing barrier that can be deployed around a casket to provide a barrier between the deceased individual and the individuals viewing the casket. The collapsible casket viewing barrier helps to minimize the spread of bacteria, viral particles, germs, and other contaminants by maintaining a safe physical distance between the attendees and the deceased, which is particularly important if the deceased was exposed to easily transmitted diseases, such as COVID-19, for example. The barrier is transparent to allow viewing and also can be easily cleaned between individuals approaching it to further reduce the chance of sickness being spread. The present invention therefore provides protection and peace of mind to funeral attendees and funeral home staff.

Devices have been disclosed in the known art that relate to transparent shields for coffins. These include devices that have been patented and disclosed in patent application publications. However, the devices in the known art have several drawbacks. These devices are typically integrated into the coffin, requiring a specially made coffin to be built, which can be expensive. This also prevents the device from being reused in future viewings and funerals. Further, the devices in the known art lack adjustability for different types and sizes of coffins and arrangements of flowers and other items that typically surround the coffin during the funeral service.

SUMMARY OF THE INVENTION

The present invention provides a collapsible casket viewing barrier wherein the same can be utilized for providing a barrier between funeral attendees and the deceased that allows funeral goers to view the deceased while also reducing the risk of diseases and germs being spread between funeral attendees. The collapsible casket viewing barrier includes a first transparent shield disposed within a first supporting frame and a second transparent shield disposed within a second supporting frame. A first support leg is affixed to an outer end of the first supporting frame, a central support leg is affixed to an inner end of the first supporting frame, and a second support leg affixed to an outer end of the second supporting frame.

The first transparent shield includes a length that is greater than a length of the second transparent shield, such that the first transparent shield extends along the length of a coffin while the second transparent shield extends perpendicularly thereto and along a shorter upper end of the coffin. Further, the first supporting frame is connected to the second supporting frame via one or more hinges. This allows the first supporting frame and the second supporting to be configured to move between a deployed configuration whereby the first supporting frame is oriented perpendicular to the second supporting frame and a collapsed configuration whereby the first supporting frame is folded against and parallel to the second supporting frame. Therefore, the present invention can be quickly deployed for use when needed or collapsed for transport or storage.

One object of the present invention is to provide a collapsible casket viewing barrier that includes lockable wheels for easy transport.

Another object of the present invention is to provide a collapsible casket viewing barrier that includes a locking mechanism and a handle to facilitate storage and transportation of the collapsible casket viewing barrier when it is in the collapsed configuration.

A further object of the present invention is to provide a collapsible casket viewing barrier that includes transparent windows which can be easily cleaned between funeral attendees approaching the casket to view the deceased individual.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
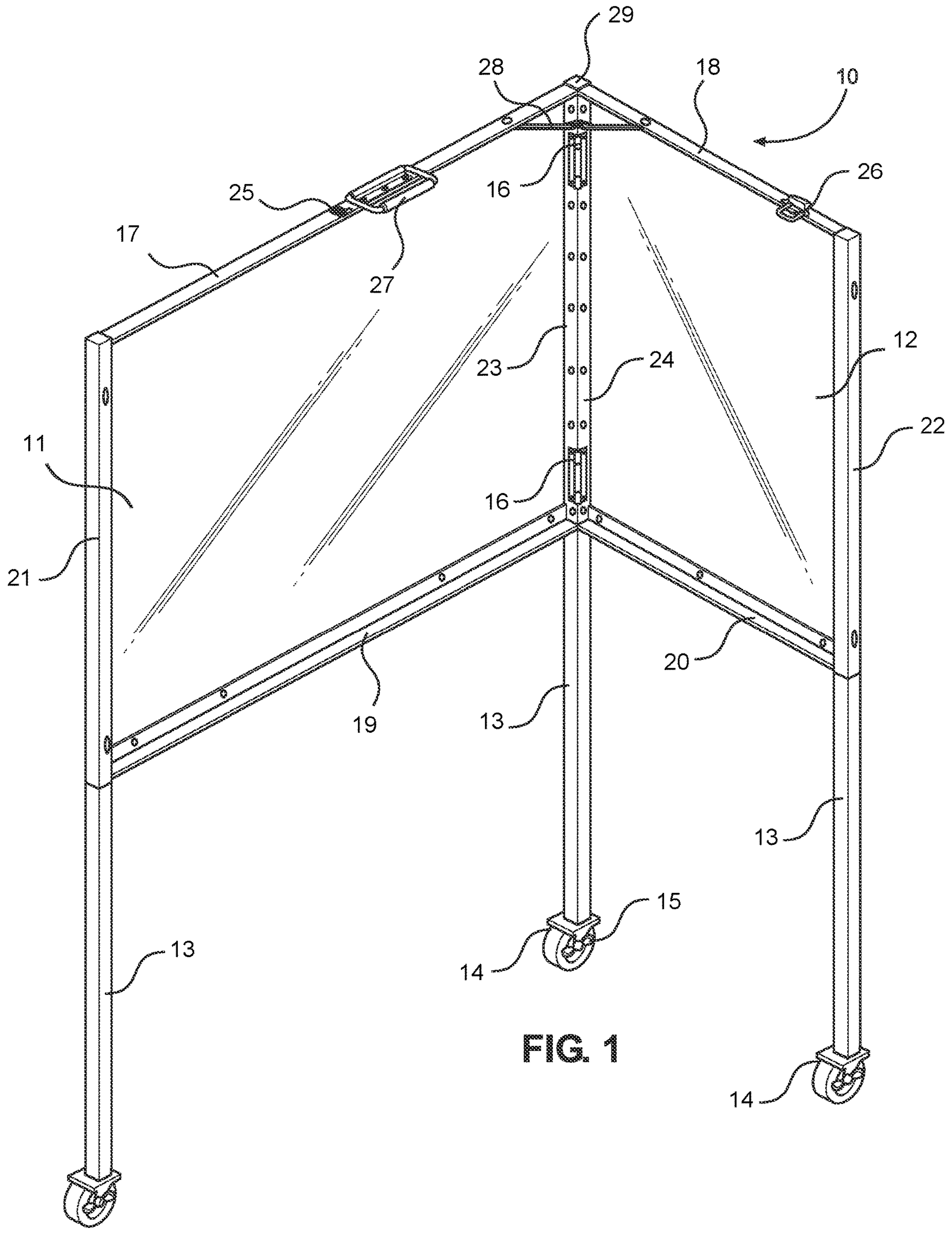
FIG. 1 shows a perspective view of an embodiment of the collapsible casket viewing barrier in the deployed configuration.

Reference is made herein to the attached drawings. Like reference numerals are used throughout the drawings to depict like or similar elements of the collapsible casket viewing barrier. For the purposes of presenting a brief and clear description of the present invention, a preferred embodiment will be discussed as used for providing a barrier between funeral attendees and deceased individuals that allows funeral attendees to view the deceased while helping to reduce the transmission of germs and diseases. The figures are intended for representative purposes only and should not be considered to be limiting in any respect.

Referring now to FIG. 1, there is shown a perspective view of an embodiment of the collapsible casket viewing barrier in the deployed configuration. The collapsible casket viewing barrier 10 generally includes a first a first transparent shield 11 that is pivotally connected to a second transparent shield 12. The length of the first transparent shield 11 is greater than the length of the second transparent shield 12, because the first transparent shield 11 is adapted to cover the length side of a casket, while the second transparent shield 12 is adapted to cover the width side of the casket (shown in FIG. 4). The transparent shields 11, 12 can be made of any suitable materials. Some example materials include polycarbonate, polyethylene, polyester, acrylic, vinyl, or glass.

The first transparent shield 11 is secured within a first supporting frame that includes an upper horizontal member 17, a lower horizontal member 19, an outer vertical member (not visible in FIG. 1) and an inner vertical member 23. Similarly, the second transparent shield 12 is secured within second supporting frame that includes an upper horizontal member 18, a lower horizontal member 20, an outer vertical member (not visible in FIG. 1), and an inner vertical member 24. The supporting frames secure to the perimeter edges of the first and second transparent shields 11, 12 to provide them structural support and attachment capabilities for other components of the present invention.

The present invention is adapted to shield a casket that is elevated on a pedestal. As such the device is supported via a plurality of support legs. The outer vertical member of the first transparent shield 11 supporting frame is attached to a first support leg 21. The inner vertical member 23 of the first transparent shield 11 supporting frame is attached to a central support leg 29. The outer vertical member of the second transparent shield 12 is attached to a second support leg 22. To support the present invention at a proper height, each of the first support leg 21, the central support leg 29, and the second support leg 22 includes a lower leg portion 13 that extends downwardly to increase the height of the legs. In the shown embodiment, each lower leg portion 13 includes a wheel 14 that facilitates easy transport of the device and position adjustments during use. In the shown embodiment, each wheel 14 includes a swivel connector configured to rotate along a vertical axis, allowing an individual to easily roll the collapsible casket viewing barrier 10 in any direction. Further, in the shown embodiment, each wheel 14 includes a locking mechanism 15 configured to selectively prevent rotation of each wheel 14 when engaged and allow rotation of each wheel 14 when disengaged. This prevents funeral attendees from moving the collapsible casket viewing barrier 10 out of its proper position if they make contact with the collapsible casket viewing barrier 10 while viewing the casket.

Figure 2:
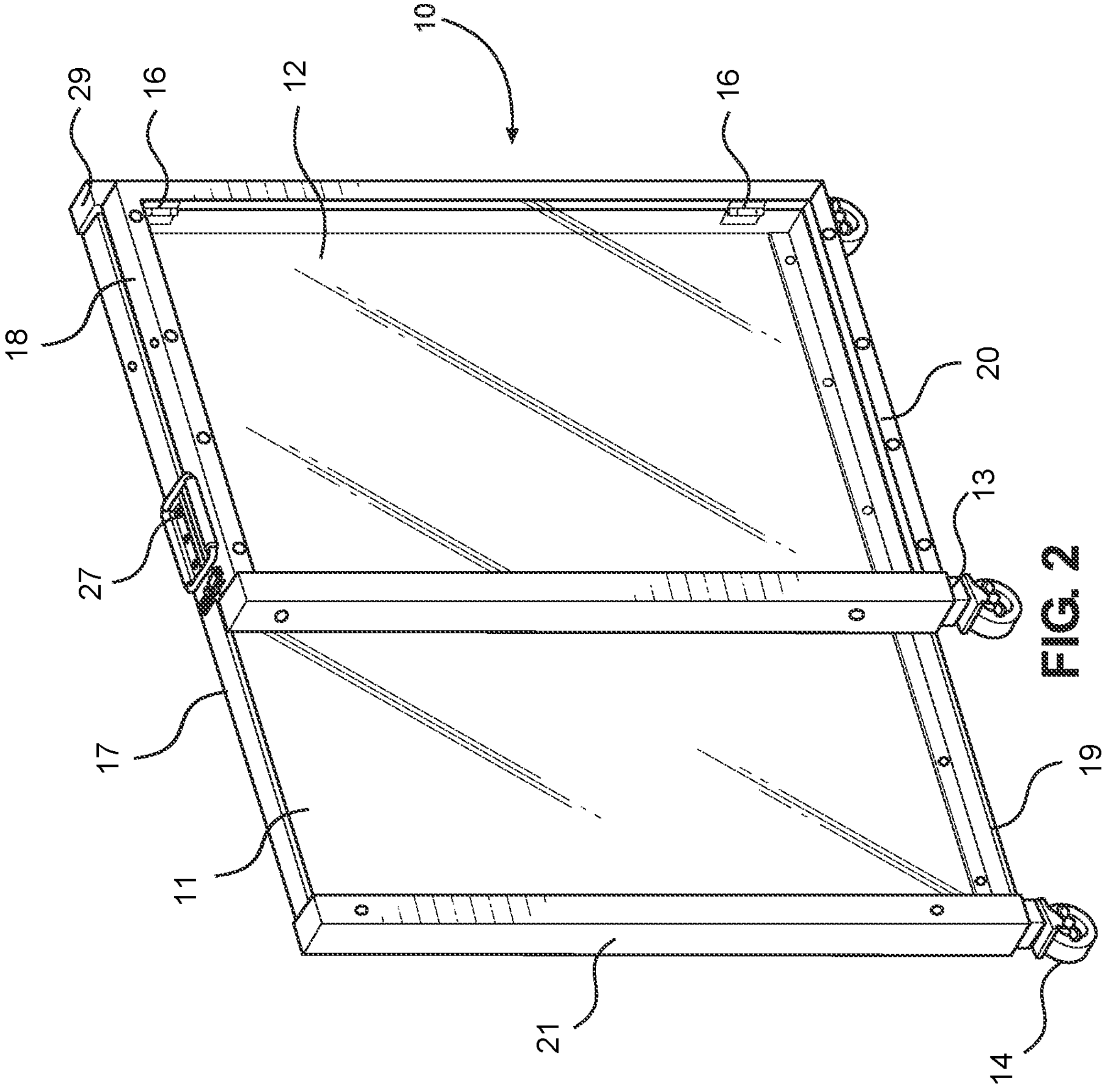
FIG. 2 shows a perspective view of an embodiment of the collapsible casket viewing barrier in the collapsed configuration.
Figure 4:
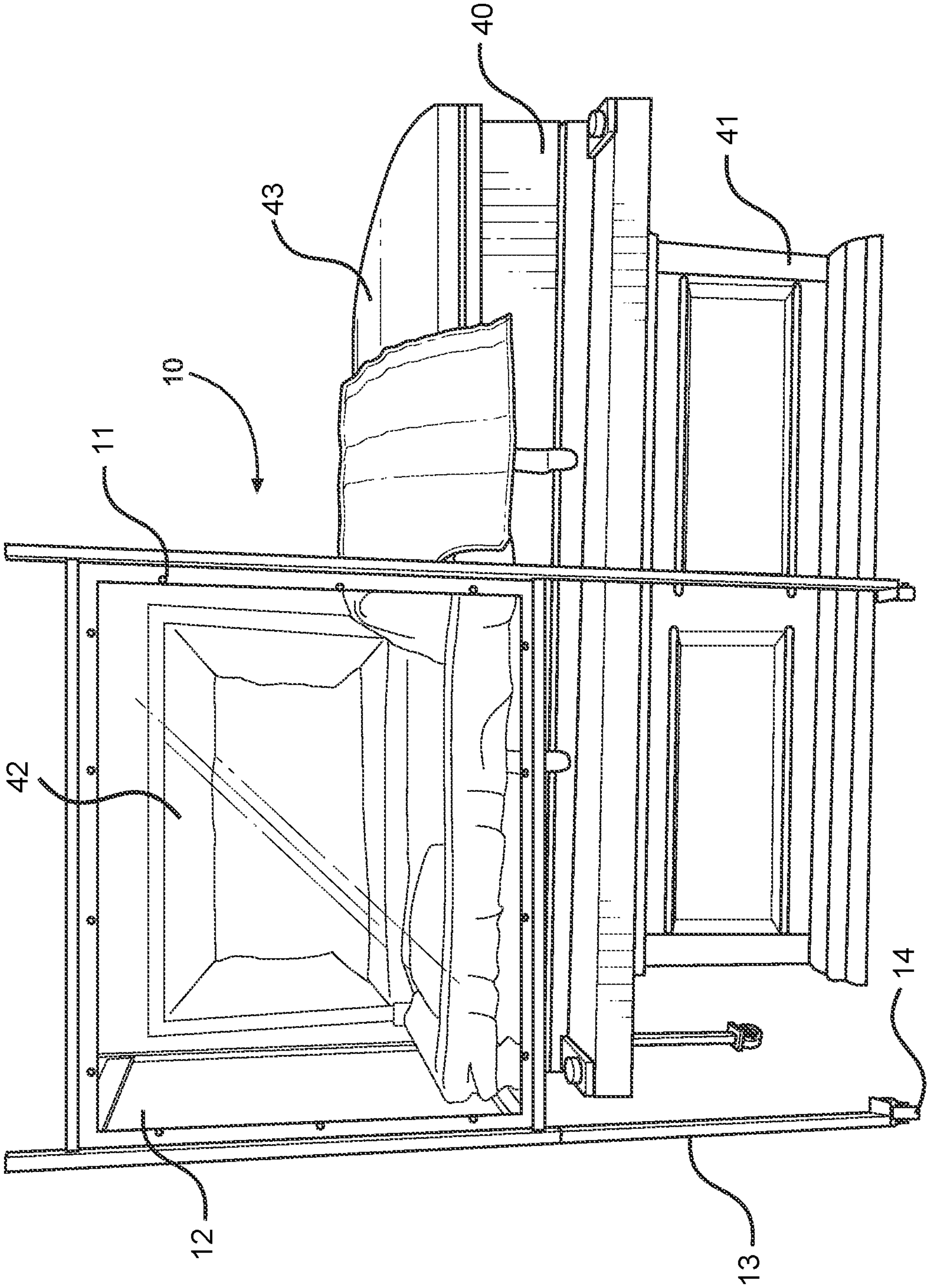
FIG. 4 shows a perspective view of an embodiment of the collapsible casket viewing barrier deployed and in use.

The first transparent shield 11 first supporting frame is connected to the second transparent shield 12 supporting frame via one or more hinges 16. In the shown embodiment, a pair of hinges 16 connect the inner vertical member 23 of the first transparent shield 11 to the inner vertical member 24 of the second transparent shield 12. The hinges 16 facilitate movement of the first transparent shield 11 supporting frame and the second transparent shield 12 supporting frame between a deployed configuration, as shown in FIG. 1, and a collapsed configuration, as shown in FIG. 2. When in the deployed configuration, the first transparent shield 11 supporting frame is oriented perpendicular to the second transparent shield 12 supporting frame, in order to enclose the upper widthwise and lengthwise sides of a casket (as shown in FIG. 4). In the shown embodiment, a pivoting brace 28 is included, which has a first end affixed to the first supporting frame and a second end affixed to the second supporting frame. The pivoting brace 28 helps maintain the collapsible casket viewing barrier 10 in its deployed configuration by resisting movement back to the collapsed configuration. Further, the shown embodiment includes a handle 27 affixed to the upper horizontal member 17 of the first supporting frame to facilitate transport of the collapsible casket viewing barrier 10. The shown embodiment also includes a locking mechanism 25, 26 configured to selectively secure the device in the collapsed configuration when engaged.

Referring now to FIG. 2, there is shown a perspective view of an embodiment of the collapsible casket viewing barrier in the collapsed configuration. The hinges 16 permit the first transparent shield 11 to fold parallel against the second transparent shield 12. In the shown embodiment, the lower portions 13 of each of the first support leg 21, the second support leg 22, and the central support leg 29 are telescopically adjustable with respect to upper portions of the first support leg 21, the second support leg 22, and the central support leg 29. This allows the collapsible casket viewing barrier 10 to further decrease in size when collapsed for storage. In other embodiments, the lower leg portions 13 are integral to or otherwise in a fixed position with respect to their respective upper leg portions. When in this collapsed configuration, the handle 27 can be utilized to easily transport the collapsible casket viewing barrier 10.

Figure 3:
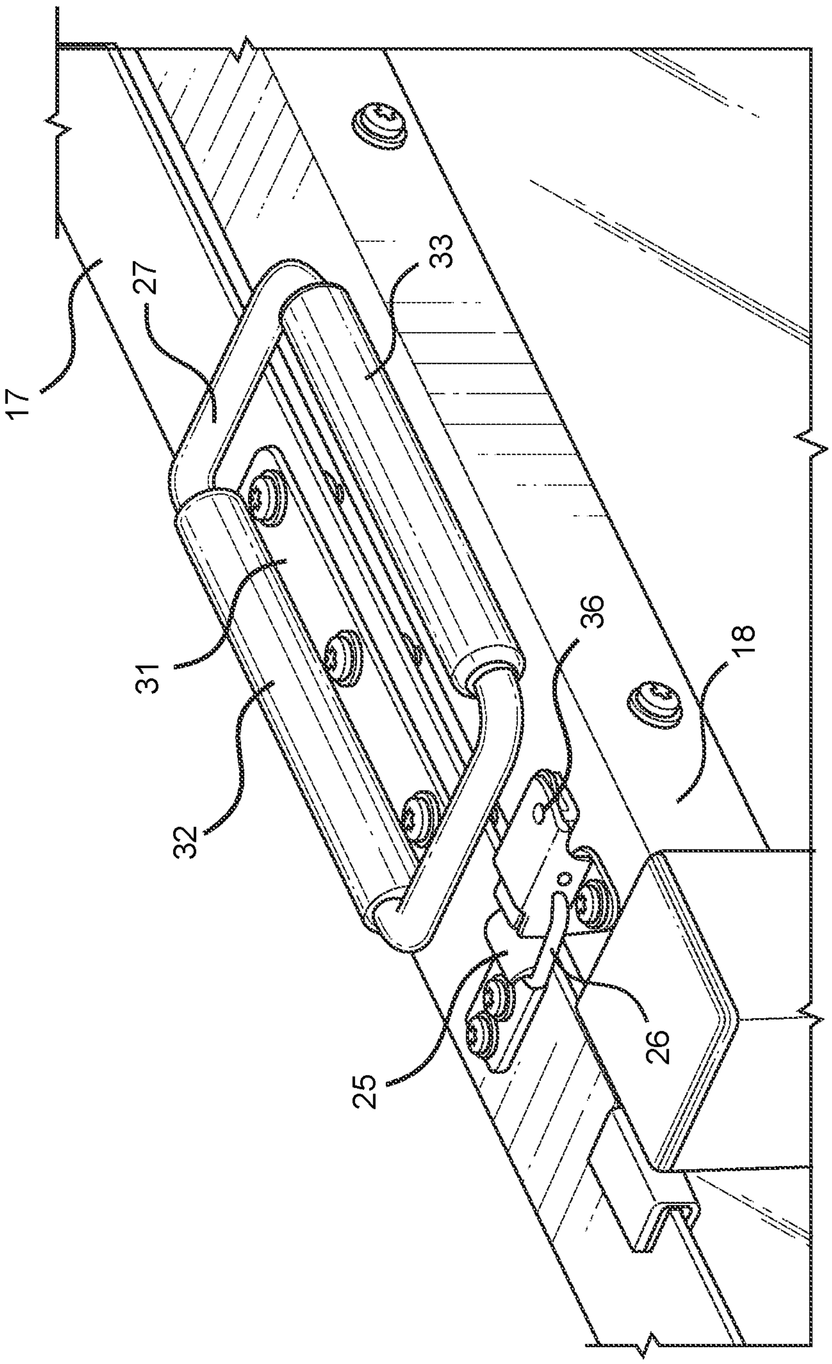
FIG. 3 shows a perspective view of the handle and locking mechanism components of an embodiment of the collapsible casket viewing barrier.

Referring now to FIG. 3, there is shown a perspective view of the handle and locking mechanism components of an embodiment of the collapsible casket viewing barrier. In the shown embodiment, the handle 27 includes an attachment plate 31 affixed to the upper horizontal member 17 of the first supporting frame via one or more fasteners. Screws are used in the shown embodiment, but any suitable fastener may be utilized. The attachment plate 31 includes an attached supporting sleeve 32 that receives the handle 27 and allows the handle 27 to rotate. Further, the handle 27 includes a grip 33. The grip 33 is a freely rotating cover that is configured to rotate independently of the handle 27. In this way, the handle automatically adjusts the orientation of the collapsible casket viewing barrier 10 as it is carried, making it much easier to transport.

The locking mechanism helps to secure the collapsible casket viewing barrier 10 in its collapsed configuration, preventing it from accidentally deploying when stored or in transport to a location for use. In the shown embodiment, the locking mechanism includes a latch receiver 25 affixed to the upper horizontal member 17 of the first supporting frame and a latch bar 26 affixed to the upper horizontal member 18 of the second supporting frame. The latch bar 26 is operably connected to a latch handle 36 that is configured to selectively lock the locking mechanism to maintain the collapsible casket viewing barrier 10 in the collapsed configuration. The latch handle 36 is connected to the upper horizontal member 18 of the second, smaller supporting frame, because the weight difference makes it easier to rotate the smaller portion of the device with respect to the larger portion.

Referring now to FIG. 4, there is shown a perspective view of an embodiment of the collapsible casket viewing barrier deployed and in use. During a funeral service, a casket 40 is typically supported on a pedestal 41 that elevates to be closer to standing funeral attendees. Many caskets include a split lid with a lower portion 43 that remains closed during the funeral service and an upper portion 42 that remains open during the funeral service to allow funeral attendees to view the deceased individual. The height of the first transparent shield 11 is equal to the height of the second transparent shield 12 to provide a uniform barrier, while the lower portions 13 of the support legs raise the shields 11, 12 up to viewing height, such that the lower edge of the shields 11, 12 generally aligns with the beginning of the open portion of the casket 40.

The first shield 11 is positioned to provide a barrier in front of the lengthwise side of the open upper portion 42 of the casket lid, while the second shield 12 is positioned to provide barrier in front of the widthwise upper edge of the casket 40. In this way, a barrier is provided between funeral attendees and all open areas of the casket, preventing accidental contact and reducing germ transmission between funeral attendees and the deceased individual. The shields 11, 12 and other components can be easily wiped down with disinfecting materials and cleaned at any time during or after the funeral service to further reduce the transmission of germs and diseases. In this way, the funeral attendees can feel more comfortable view the deceased individual by protecting themselves from infectious diseases.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention. Therefore, the foregoing is considered as illustrative only of the principles of the invention. Further, it is not desired to limit the invention to the exact construction and operation shown and described, and accordingly, all suitable modifications and equivalents may be resorted to, falling within the scope of the invention.

We claim:

1. A collapsible casket viewing barrier, comprising:

a first transparent shield disposed within a first supporting frame;

a second transparent shield disposed within a second supporting frame;

a first support leg affixed to an outer end of the first supporting frame;

a central support leg affixed to an inner end of the first supporting frame;

a second support leg affixed to an outer end of the second supporting frame;

wherein the first transparent shield includes a length that is greater than a length of the second transparent shield;

wherein the first supporting frame is connected to the second supporting frame via one or more hinges; and wherein the first transparent shield includes a height that is equal to a height of the second transparent shield.

2. The collapsible casket viewing barrier of claim 1, wherein the first supporting frame and the second supporting frame are configured to move between a deployed configuration whereby the first supporting frame is oriented perpendicular to the second supporting frame and a collapsed configuration whereby the first supporting frame is folded against and parallel to the second supporting frame.

3. The collapsible casket viewing barrier of claim 2, further comprising a locking mechanism configured to selectively secure the device in the collapsed configuration when engaged.

4. The collapsible casket viewing barrier of claim 3, wherein the locking mechanism comprises a latch receiver affixed to an upper horizontal member of the first supporting frame and a latch bar affixed to an upper horizontal member of the second supporting frame, wherein the latch bar is operably connected to a latch handle that is configured to selectively lock the locking mechanism to maintain the collapsible casket viewing barrier in the collapsed configuration.

5. The collapsible casket viewing barrier of claim 2, further comprising a pivoting brace having a first end affixed to the first supporting frame and a second end affixed to the second supporting frame.

6. The collapsible casket viewing barrier of claim 1, wherein the first support leg, the second support leg, and the central support leg each includes a lower portion having a wheel.

7. The collapsible casket viewing barrier of claim 6, wherein the lower portions of each of the first support leg, the second support leg, and the central support leg are telescopically adjustable with respect to upper portions of the first support leg, the second support leg, and the central support leg.

8. The collapsible casket viewing barrier of claim 6, wherein each wheel includes a swivel connector configured to rotate along a vertical axis.

9. The collapsible casket viewing barrier of claim 6, wherein each wheel comprises a locking mechanism configured to selectively prevent rotation of each wheel when engaged and allow rotation of each wheel when disengaged.

10. The collapsible casket viewing barrier of claim 1, further comprising a handle affixed to an upper horizontal member of the first supporting frame.

11. The collapsible casket viewing barrier of claim 10, wherein the handle comprises an attachment plate affixed to the upper horizontal member of the first support frame via one or more fasteners.

12. The collapsible casket viewing barrier of claim 11, wherein the attachment plate comprises an attached supporting sleeve that receives the handle and allows the handle to rotate.

13. The collapsible casket viewing barrier of claim 12, wherein the handle further comprises a grip.

14. The collapsible casket viewing barrier of claim 13, wherein the grip comprises a freely rotating cover that is configured to rotate independently of the handle.

15. The collapsible casket viewing barrier of claim 1, wherein each of the first transparent shield and the second transparent shield comprises at least one material selected from the group of: polycarbonate, polyethylene, polyester, acrylic, vinyl, or glass.

* * * * *